United States Patent
Joye et al.

(10) Patent No.: US 7,424,114 B2
(45) Date of Patent: Sep. 9, 2008

(54) METHOD FOR ENHANCING SECURITY OF PUBLIC KEY ENCRYPTION SCHEMAS

(75) Inventors: Marc Joye, Saint Zacharie (FR); Jean-Sébastien Coron, Paris (FR); Pascal Paillier, Paris (FR)

(73) Assignee: Gemplus, Gemenos (FR)

( * ) Notice: Subject to any disclaimer, the term of this patent is extended or adjusted under 35 U.S.C. 154(b) by 747 days.

(21) Appl. No.: 10/450,856

(22) PCT Filed: Nov. 20, 2001

(86) PCT No.: PCT/FR01/03645

§ 371 (c)(1),
(2), (4) Date: Jan. 20, 2004

(87) PCT Pub. No.: WO02/51065

PCT Pub. Date: Jun. 27, 2002

(65) Prior Publication Data

US 2004/0120519 A1    Jun. 24, 2004

(30) Foreign Application Priority Data

Dec. 18, 2000 (FR) .................................. 00 16573

(51) Int. Cl.
*H04L 9/30* (2006.01)
(52) U.S. Cl. .......................... 380/30; 380/282; 380/285
(58) Field of Classification Search ............. 380/28–30, 380/259–260, 282, 285
See application file for complete search history.

(56) References Cited

U.S. PATENT DOCUMENTS 5,799,088 A * 8/1998 Raike .......................... 380/30
6,266,771 B1 * 7/2001 Bellare et al. ............... 713/176
7,162,037 B1 * 1/2007 Schwenk .................... 380/286

OTHER PUBLICATIONS

Fujisaki et al., "Secure Integration of Asymmetric and Symmetric Encryption Schemes", Proceedings of the 19th Annual International Cryptology Conference on Advances in Cryptology, Lecture Notes in Computer Science; 1999, vol. 1666, pp. 537-554.*
Rogaway et al., "Optimal Asymmetric Encryption-How to Encrypt with RSA", Eurocrypt 94 Proceedings, Lecture Notes in Computer Science, 1995, vol. 950, A. De Santis et al., Springer-Verlag, pp. 1-19.*
Naccache et al., "A New Public Key Comsumption Based on Higher Resides", ACM, 1998, Conference on Computer and Communications Security, Proceedings of the 5th ACM Conference on Computer and Communications Security, pp. 59-66.*
Rogaway et al., "Random Oracles are Practical: A Paradigm for Designing Efficient Protocols", Oct. 1995, Proceedings of the First ACM Conference on Computer and Communications Security ACM.*
Canetti et al., "The Random Oracle Methodology, Revisted", 1998, Annual ACM Symposium on Theory of Computing; Proceedings of the thirtieth annual ACM Symposium on Theory of computing pp. 209-218.*
Shoup V., "OAEP Reconsidered", Sep. 18, 2001, Crypto 2001.*
Goldwasser et al., "Probailistic Encryption", Journal of Computer and System Sciences, 1984.*

* cited by examiner

*Primary Examiner*—Gilberto Barron, Jr.
*Assistant Examiner*—Tongoc Tran
(74) *Attorney, Agent, or Firm*—Buchanan Ingersoll & Rooney PC

(57) ABSTRACT

There exist numerous public key probabilistic encryption algorithms. Most of these algorithms do not have a maximum security level against someone capable of chosen ciphertext attacks. The disclosed method provides a construct to enhance the security of any public key probabilistic or deterministic encryption algorithm to achieve an optimal security level.

15 Claims, No Drawings

METHOD FOR ENHANCING SECURITY OF PUBLIC KEY ENCRYPTION SCHEMAS

This disclosure is based upon French Application No. 00/16573, filed Dec. 18, 2000 and International Application No. PCT/FR01/03645, filed Nov. 20, 2001. the contents of which are incorporated herein by reference.

BACKGROUND OF THE INVENTION

The present invention relates to a method for increasing the security of public key encryption algorithms. An encryption schema comprises an encryption algorithm and a decryption algorithm each having a particular encryption and decryption method.

In the conventional secret key cryptography model, two people wishing to communicate by means of a non-secure channel must first agree upon a secret encryption key K. The encryption function and the decryption function use the same key K. The drawback of the secret key encryption system is that said system requires prior communication of the key K between the two people by means of a secure channel, before any encrypted message is sent across the non-secure channel. In practice, it is generally difficult to find a perfectly secure communication channel, especially if the distance separating the two people is large. Secure channel means a channel for which it is impossible to know or modify the information passing through said channel. Such a secure channel can be implemented by a cable connecting two terminals, owned by said two people.

The concept of public key cryptography was invented by Whitfield Diffie and Martin Hellman in 1976. Public key cryptography makes it possible to solve the problem of distribution of keys across a non-secure channel. The principle of public key cryptography consists of using a pair of keys, a public encryption key and a private decryption key. It must be computationally impracticable to find the private decryption key from the public encryption key. A person A wishing to communicate information to a person B uses the public encryption key of person B. Only person B possesses the private key associated with their public key. Only person B is therefore capable of decrypting the message sent to them.

Another advantage of public key cryptography over secret key cryptography is that public key cryptography allows authentication through the use of electronic signing.

The first public key encryption schema implementation was devised in 1977 by Rivest, Shamir and Adleman, who invented the RSA encryption system. The security of RSA is based on the difficulty of factorising a large number which is the product of two prime numbers. Since then, numerous public key encryption systems have been proposed, the security of which is based on different computational problems (this list is not exhaustive):

Merkle-Hellman knapsack:

This encryption system is based on the difficulty of the subset sum problem.

McEliece:

This encryption system is based on algebraic code theory. It is based on the linear code decoding problem.

El-Gamal:

This encryption system is based on the difficulty of the discrete logarithm in a finite field.

Elliptical curves:

The elliptical curve encryption system constitutes a modification of existing cryptographic systems in order to apply them to the field of elliptical curves. The advantage of elliptical curve encryption systems is that they require a smaller key size than for the other encryption systems.

In the following, it is understood that all the elements necessary for the encryption schema of the invention, like for example the message M, the encrypted item C and all the abbreviations of letters or letters and numerals which follow in the description below, are integer numbers equivalent to bit strings. For example, the symbol a||b denotes the concatenation of the binary representations of the integers a and b, which are in fact the respective bit strings of a and b.

A deterministic encryption algorithm takes at the input the message M to be encrypted and returns at the output the encrypted message C.

Furthermore, a probabilistic encryption algorithm usually takes at the input the message M to be encrypted and a random number u, and returns at the output an encrypted message C, using the public key of the recipient. The decryption algorithm takes at the input the encrypted item C and returns at the output the message M, using the private key. One example of a public key probabilistic encryption algorithm is the El-Gamal encryption algorithm.

However, the majority of public key probabilistic encryption algorithms do not in themselves have a sufficient level of security. This is because there are numerous practical situations in which an attacker can have access to a data processing machine implementing the decryption algorithm using the private key. If the attacker possesses an encrypted message C, they can thus request the decryption machine to decrypt certain well-chosen encrypted messages C', different from the encrypted message C, and thus obtain information on the message M corresponding to the encrypted message C.

DESCRIPTION OF THE INVENTION

The method of the invention consists of a method making it possible to increase the level of security of any public key probabilistic or deterministic encryption algorithm. From a public key encryption algorithm for which an attacker cannot obtain the plain text message from the encrypted message C, a public key encryption algorithm is constructed for which an attacker cannot obtain information on the plain text message from the encrypted message C, even if the attacker has access to a machine allowing them to decrypt any encrypted message C' different from C. The construction uses in addition a secret key encryption algorithm, such that information on the message M cannot be obtained from the corresponding encrypted message C. A hybrid construction is thus obtained, making use simultaneously of a public key encryption algorithm and a secret key encryption algorithm, in order to obtain a hybrid encryption schema having a maximum level of security.

The method of the invention therefore uses a public key probabilistic or deterministic encryption schema EP taking at the input a message mp and a random number u and returning at the output an encrypted item cp. The method also uses a secret key encryption algorithm ES taking at the input a message ms and returning at the output an encrypted item cs, using a key k. The public key probabilistic or deterministic encryption algorithm uses the key pk for encrypting a message. Decryption is carried out using the corresponding private key sk.

The method of the invention comprises two distinct methods each comprising two parts:

the first method uses a probabilistic encryption algorithm and comprises two parts: the first part taking at the input the message M to be encrypted and the public key pk and returning at the output the encrypted message C; the second part is the corresponding decryption algorithm taking at the input an encrypted message C and the private key sk and returning at the output the plain text message M;

the second method uses a deterministic encryption algorithm and comprises two parts: the first part taking at the input the message M to be encrypted and the public key pk and returning at the output the encrypted message C; the second part is the corresponding decryption algorithm taking at the input an encrypted message C and the private key sk and returning at the output the plain text message M.

The first part and the second part of each of the methods of the invention also use a hash function F taking at the input a random number r and the message M, a hash function G and a hash function H.

The first part of the first method of the invention comprises the following steps:

a) Randomly generating a random number r;
b) Applying the hash function F to the message M and to the random number r in order to obtain s;
c) Applying the hash function H to s and performing an Exclusive OR of the result with r in order to obtain t;
d) Defining the intermediate message w=s∥t, where ∥ denotes the concatenation of two bit strings;
e) Applying the encryption algorithm EP to the intermediate message w and to a random number u in order to obtain c1, using the public key pk;
f) Applying the hash function G to w and c1 in order to obtain k;
g) Applying the encryption algorithm ES to the message M using the key k in order to obtain the encrypted item c2;
h) The encrypted message C is C=c1∥c2.

The second part of the first method of the invention comprises the following steps:

a) Splitting the encrypted message C into c1 and c2;
b) Applying to c1 a decryption algorithm $EP^{-1}$ corresponding to the encryption algorithm EP, using a private key sk in order to obtain the intermediate message w=s∥t;
c) Applying the hash function G to w and c1 in order to obtain k;
d) Applying the decryption algorithm $ES^{-1}$ corresponding to the encryption algorithm ES to the encrypted message c2 using the key k in order to obtain the message M;
e) Applying the hash function H to S and performing an Exclusive OR with t in order to obtain r;
f) Applying the hash function F to the message M and to the random number r in order to obtain s';
g) Verifying that s'=s;
If s' and s are different, rejecting the encrypted message C;
Otherwise, going to step h;
h) Returning the plain text message M.

The first part of the second method of the invention comprises the following steps:

a) Randomly generating a random number r;
b) Applying the hash function F to the message M and to the random number r in order to obtain s;
c) Applying the hash function H to s and performing an Exclusive OR of the result with r in order to obtain t;
d) Defining the intermediate message w=s∥t, where ∥ denotes the concatenation of two bit strings;
e) Applying the encryption algorithm EP to the intermediate, message w in order to obtain c1, using the public key pk;
f) Applying the hash function G to w and c1 in order to obtain k;
g) Applying the encryption algorithm ES to the message M using the key k in order to obtain the encrypted item c2;
h) The encrypted message C is C=c1∥c2.

The second part of the second method of the invention comprises the following steps:

a) Splitting the encrypted message C into c1 and c2;
b) Applying to c1 a decryption algorithm $EP^{-1}$ corresponding to the encryption algorithm EP using a private key sk in order to obtain the intermediate message w=s∥t;
c) Applying the hash function G to w and c1 in order to obtain k;
d) Applying the decryption algorithm $ES^{-1}$ corresponding to the encryption algorithm ES to the encrypted message c2 using the key k in order to obtain the message M;
e) Applying the hash function H to s and performing an Exclusive OR with t in order to obtain r;
f) Applying the hash function F to the message M and to the random number r in order to obtain s';
g) Verifying that s'=s;
If s' and s are different, rejecting the encrypted message C;
Otherwise, going to step h;
h) Returning the plain text message M.

Preferentially, the steps d of the first part of the two methods are replaced by the calculation w=i∥s∥t or w=s∥i∥t or w=s∥t∥i, where i is any value which may contain useful information like for example the binary size of the message M or the identity of the entity which encrypted M and sent the encrypted message C. Also, the secret key encryption algorithm ES is replaced in the steps g by an Exclusive OR operation between the message M to be encrypted and the key k, in order to obtain the encrypted item c2.

Also preferentially, the steps b of the second parts of the two methods are replaced by the operations w=i∥s∥t or w=s∥i∥t or w=sμt∥i, and make it possible to deduce therefrom the value i for any calculation or verification purpose. Also, the secret key decryption algorithm $ES^{-1}$ is replaced in the steps d by an Exclusive OR operation between the message c2 to be encrypted and the key k, in order to obtain the encrypted item M.

The public key encryption algorithm constructed is therefore a hybrid encryption algorithm using both a public key encryption algorithm and a secret key encryption algorithm, which makes it possible to obtain better performance as regards encryption times. The public key encryption algorithm thus constructed has an optimum level of security: an attacker cannot obtain information on the plain text message M corresponding to the encrypted message C, even if they have access to a decryption machine allowing them to decrypt any message C' distinct from C.

The above-described methods of the invention are intended for portable electronic objects of the smart card type.

The invention claimed is:

1. A public key encryption method comprising the following steps:

a) generating a random number r,
b) Applying a hash function F to a message M and to the random number r in order to obtain a first bit string s;
c) Applying a hash function H to s and performing an Exclusive OR of the result with r in order to obtain a second bit string t;
d) Defining an intermediate message w=s∥t, where ∥ denotes the concatenation of two bit strings;
e) Applying a public key probabilistic encryption algorithm EP to the intermediate message w and to a random number u in order to obtain a first encrypted item c1, using a public key pk;
f) Applying a hash function G to w and c1 in order to obtain a key k;

g) Applying a secret key encryption algorithm ES to the message M using the key k in order to obtain a second encrypted item c2; and h) Generating the encrypted message C=c1∥c2.

2. A public key decryption method corresponding to the public key encryption method according to claim 1, comprising the following steps:
   i) Splitting the encrypted message C into c1 and c2;
   j) Applying to c1 a decryption algorithm $EP^{-1}$ corresponding to the encryption algorithm EP, using a private key sk that corresponds to the public key pk, in order to obtain the intermediate message w=s∥t,
   k) Applying the hash function G to w and c1 in order to obtain k;
   l) Applying the decryption algorithm $ES^{-1}$ corresponding to the encryption algorithm ES to the encrypted message c2 using the key k in order to obtain the message M;
   m) Applying the hash function H to s and performing an Exclusive OR with t in order to obtain r,
   n) Applying the hash function F to the message M and to the random number r in order to obtain s';
   o) Verifying that s'=s;
      If s' and s are different, rejecting the encrypted message C;
      Otherwise, going to step p;
   p) Returning the plain text message M.

3. A method according to claim 1, wherein step d comprises calculating w=i∥s∥t or w=s∥i∥t or w=s∥t∥i, where i is any value which contains useful information.

4. A method according to claim 1, implemented in a portable electronic object of the smart card type.

5. The method of claim 3, wherein i contains information regarding the binary size of the message M.

6. The method of claim 3, wherein i contains information regarding the identity of the entity which encrypted M and sent the message C.

7. A public key encryption method comprising the following steps:
   generating a random number r;
   Applying a hash function F to a message M and to the random number r in order to obtain a first bit string s;
   Applying a hash function H to s and performing an Exclusive OR of the result with r in order to obtain a second bit string t;
   Defining an intermediate message w=s∥t, where ∥ denotes the concatenation of two bit strings;
   Applying a public key deterministic encryption algorithm EP to the intermediate message w in order to obtain a first encrypted item c1, using a public key pk;
   Applying a hash function G to w and c1 in order to obtain a key k;
   Applying a secret key encryption algorithm ES to the message M using the key k in order to obtain the a second encrypted item c2; and
   Generating an encrypted message C=c1∥c2.

8. A public key decryption method corresponding to the public key encryption method according to claim 7, comprising the following steps:
   i) Splitting the encrypted message C into c1 and c2;
   j) Applying to c1 a decryption algorithm $EP^{-1}$ corresponding to the encryption algorithm EP, using a private key sk that corresponds to the public key pk, in order to obtain the intermediate message w=s∥t;
   k) Applying the hash function G to w and c1 in order to obtain k;
   l) Applying the decryption algorithm $ES^{-1}$ corresponding to the encryption algorithm ES to the encrypted message c2 using the key k in order to obtain the message M;
   m) Applying the hash function H to s and performing an Exclusive OR with t in order to obtain r;
   n) Applying the hash function F to the message M and to the random number r in order to obtain s';
   o) Verifying that s'=s;
      If s' and s are different, rejecting the encrypted message C;
      Otherwise, going to step p;
   p) Returning the plain text message M.

9. A method according to claim 7, wherein step d comprises calculating w=i∥s∥t or w=s∥i∥t or w=s∥t∥i, where i is any value which contains useful information.

10. The method of claim 9, wherein i contains information regarding the binary size of the message M.

11. The method of claim 9, wherein i contains information regarding the identity of the entity which encrypted M and sent the message C.

12. A method according to claim 9, implemented in a portable electronic object of the smart card type.

13. A method comprising the following steps:
   a) generating a random number r;
   b) Applying a hash function F to a message M and to the random number r in order to obtain a first bit string s;
   c) Applying a hash function H to s and performing an Exclusive OR of the result with r in order to obtain a second bit string t;
   d) Defining an intermediate message w=s∥t, where ∥ denotes the concatenation of two bit strings;
   e) Applying a public key probabilistic encryption algorithm EP to the intermediate message w and to a random number u in order to obtain a first encrypted item c1, using a public key pk;
   f) Applying a hash function G to w and c1 in order to obtain a key k;
   g) performing an Exclusive OR operation between the message M to be encrypted and the key k, in order to obtain a second encrypted item c2; and
   h) Generating the encrypted message C=c1∥c2.

14. A public key encryption method comprising the following steps:
   generating a random number r;
   Applying a hash function F to a message M and to the random number r in order to obtain a first bit string s;
   Applying hash function H to s and performing an Exclusive OR of the result with r in order to obtain a second bit string t;
   Defining an intermediate message w=s∥t, where ∥ denotes the concatenation of two bit strings;
   Applying a public key deterministic encryption algorithm EP to the intermediate message w in order to obtain a first encrypted item c1, using a public key pk;
   Applying a hash function G to w and c1 in order to obtain a key k;
   performing an exclusive OR operation between the message M to be encrypted and the key k, in order to obtain a second encrypted item c2; and
   Generating an encrypted message C=c1∥c2.

15. A method according to claim 14, implemented in a portable electronic object of the smart card type.

* * * * *